United States Patent
Bleck et al.

[11] 3,966,703
[45] June 29, 1976

[54] ASYMMETRICAL FRISAZO DYESTUFFS DERIVED FROM DIAZOTIZED 2,7-DIAMINO-CARBAZOLE

[75] Inventors: Wolf-Eckhard Bleck; Horst Nickel, both of Leverkusen; Karl-Heinz Schündehütte, Opladen, all of Germany

[73] Assignee: Bayer Aktiengesellschaft, Leverkusen, Germany

[22] Filed: July 20, 1973

[21] Appl. No.: 381,167

[30] Foreign Application Priority Data
July 21, 1972 Germany............................ 2235815

[52] U.S. Cl................... 260/146 R; 260/146 D; 260/147; 260/154; 260/155; 260/156; 260/158; 260/159; 260/160
[51] Int. Cl.².......................................... C09B 35/46
[58] Field of Search.................... 260/146 R, 164

[56] References Cited
UNITED STATES PATENTS

| | | | |
|---|---|---|---|
| 401,634 | 4/1889 | Bohn | 260/164 |
| 625,198 | 5/1899 | Phillips et al. | 260/164 |
| 1,697,107 | 1/1929 | Glingestein et al. | 260/164 |
| 1,751,683 | 3/1930 | Clingestein et al. | 260/164 |
| 1,975,411 | 10/1934 | Stüsser et al. | 260/164 |
| 2,014,484 | 9/1935 | Stüsser et al. | 260/146 R |
| 2,061,126 | 11/1936 | Zahn et al. | 260/164 |
| 2,872,440 | 2/1959 | Davies | 260/164 |

OTHER PUBLICATIONS
Cohn "Die Carbazolgruppe" (1919) pp. 151–152, Verlag Georg Thieme

*Primary Examiner*—Henry R. Jiles
*Assistant Examiner*—R.W. Ramsuer
*Attorney, Agent, or Firm*—Plumley & Tyner

[57] ABSTRACT

Azo dyestuffs of the formula

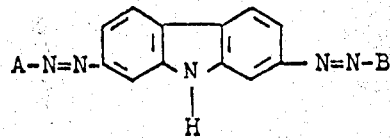

wherein A and B are different radicals of an aromatic coupling component are described. The new dyestuffs are outstandingly suitable for dyeing and printing natural or synthetic fibre materials containing hydroxyl groups and nitrogen like wool, wool-cotton union, silk, high molecular polyamide as well as paper pulp and paper materials and leather to give dyeings havings good fastness properties.

7 Claims, No Drawings

ASYMMETRICAL FRISAZO DYESTUFFS DERIVED FROM DIAZOTIZED 2,7-DIAMINO-CARBAZOLE

The present invention relates to azo dyestuffs of the general formula

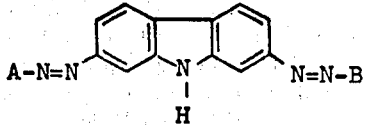

wherein

A and B denote aromatic-carbocyclic, aromatic-heterocyclic or aliphatic radicals which are different from one another.

The dyestuffs of the formula (I) are asymmetrical with regard to the plane of symmetry passing through the heterocyclic five-membered ring of the carbazole.

Preferred radicals A and B are radicals of aromatic-carbocyclic, aromatic-heterocyclic or aliphatic coupling components which contain hydroxyl groups or amino groups, especially those of the hydroxybenzene, hydroxynaphthalene, aminobenzene, aminonaphthalene, acylacetic acid arylide, pyrazolone, iminopyrazole, pyridone, pyrimidone, quinolone and indole series.

The radicals A and B can contain substituents customary in dyestuffs, for example alkyl, aryl, aralkyl, alkoxy, aryloxy, amino, alkylamino, arylamino, acylamino, alkylcarbonyl, arylcarbonyl, ureido, heterylamino, nitro, halogen, nitrile, thiocyano, mercapto, sulpho, alkylsulphonyl, arylsulphonyl, sulphamido, carbalkoxy, hydroxyl, arylazo, carboxyl or acyloxy.

Examples of suitable alkyl groups are: straight-chain and branched alkyl radicals which are optionally substituted by halogen, hydroxyl or alkoxy, preferably those with 1-4 C atoms, such as —CH$_3$, —C$_2$H$_5$, n— and i—C$_3$H$_7$, n—, i- and t—C$_4$H$_9$, —CH$_2$Cl, —C$_2$H$_4$Cl, —CF$_3$, —CH$_2$—CH$_2$—OH, CH$_2$—CH$_2$—OCH$_3$, —CH$_2$—CH$_2$—OC$_2$H$_5$ and —C$_2$H$_4$CN.

Examples of suitable aryl groups are: mononuclear and condensed aryl radicals, such as the phenyl or naphthalene radical, which are optionally substituted further.

Examples of suitable aralkyl groups are: benzyl, phenylethyl, phenylethylene and sulphobenzyl radicals, which are optionally substituted further.

Examples of suitable alkoxy and aryloxy radicals are those with 1–7 C atoms, such as, for example, those with mononuclear and condensed aryl radicals, such as methoxy, ethoxy, phenoxy, benzyloxy, β-hydroxyethoxy, tolyloxy and sulphophenoxy radicals.

Examples of suitable alkylamino groups are: mono- and di-C$_1$-C$_7$-alkylamino groups, such as methylamino, ethylamino, propylamino, butylamino, isopropylamino and dimethylamino groups, optionally with further substituents in the alkyl chain, especially halogen, nitrile, hydroxyl, carbethoxy and carbonamido groups.

Examples of suitable arylamino groups are: phenylamino, phenylmethylamino and phenylethylamino groups, optionally with further substituents in the phenyl ring, such as alkyl, alkoxy, halogen, hydroxyl, amino, carboxyl, sulpho, carbonamido, sulphonamido and nitro groups.

Examples of suitable acylamino groups are: formylcarbonylamino, alkylcarbonylamino and arylcarbonylamino radicals, such as acetylamino and propionylamino groups which are optionally substituted, for example by halogen, especially Cl, for example chloroacetylamino, also benzoylamino, chlorobenzoylamino, nitrobenzoylamino and methylbenzoylamino radicals, as well as ureido or arylureido radicals, and also alkylsulphonylamino or arylsulphonylamino radicals, such as methylsulphonylamino, ethylsulphonylamino, propylsulphonylamino and phenylsulphonylamino groups, which can be substituted further, for example by hydroxyl or halogen.

Examples of suitable heterylamino substituents are: derivatives of heterocyclic compounds containing nitrogen, oxygen or sulphur and containing a carbonyl or sulphonyl group as the linking group, such as nicotinyl- and isonicotinyl-, thiophenylcarbonyl- or benzthiazolecarbonylamino groups, which optionally contain further substituents in the heterocyclic or carbocyclic part, especially alkyl, halogen, alkylsulphonyl, nitro and optionally substituted amminoalkoxy groups.

Suitable halogen atoms are F, Cl, Br and I.

Examples of suitable mercapto groups are: alkylmercapto and phenylmercapto groups, which can optionally also be substituted further.

Examples of suitable alkylsulphonyl radicals are: C$_1$-C$_3$-alkylsulphonyl groups, such as methylsulphonyl, ethylsulphonyl and propylsulphonyl radicals, which are optionally substituted further, for example by hydroxyl or halogen.

Examples of suitable arylsulphonyl radicals are: phenylsulphonyl, optionally substituted further by alkyl, amino, sulpho, alkylsulphonyl and halogen, such as tolylsulphonyl, chlorophenylsulphonyl and β-hydroxyethylphenylsulphonyl.

Examples of suitable sulphonamide groups are: sulphonamide groups which are monosubstituted or disubstituted by C$_1$-C$_7$-alkyl, aralkyl or aryl which are optionally substituted further, such as N-methyl-, N-dimethyl-, N-ethyl-, N-diethyl-, N-propionyl-, N-benzyl-, N-phenyl- and N-phenyl-N-methyl-sulphonamide, wherein the alkyl or aryl radicals can be substituted further, for example by alkoxy, hydroxyl, nitrile, halogen, sulpho or alkylsulphonyl.

Examples of suitable carbalkoxy groups are: especially those with a C$_1$-C$_3$-alkyl radical such as the carbomethoxy, carboethoxy and carbopropoxy radical, wherein the alkyl radical can be substituted further, preferably by halogen, nitrile, hydroxyl, alkoxy or carbalkoxy.

Examples of suitable arylazo groups are: metallised and metal-free phenylazo or naphthylazo groups, which are optionally substituted further by the indicated substitutents.

By acyloxy there are understood alkyl-, aryl- or heteryl-carbonyl or -sulphonyloxy radicals which can optionally be substituted, for example by halogen (especially Cl or bromine), carboxyl, sulpho, nitro or alkyl (especially methyl), such as, for example, acetoxy, chloroacetoxy, propionyloxy, chloropropionyloxy, benzoyloxy, chlorobenzoyloxy, nitrobenzoyloxy, methylbenzoyloxy, nicotinoyloxy, isonicotinoyloxy, methanesulphonyloxy, ethanesulphonyloxy, benzenesulphonyloxy, chlorobenzenesulphonyloxy, nitrobenzenesulphonyloxy, toluenesulphonyloxy, carboxybenzenesulphonyloxy, sulphobenzenesulphonyloxy, α- and β-naphthalenesulphonyloxy, diphenylsulphonyloxy and pyridinesulphonyloxy.

Sulpho groups are particularly preferred as substituents.

Suitable radicals A and B in the formula (I) are derived, for example, from the coupling components A-H or B-H listed below:

Phenols, such as phenol, 2-, 3- and 4-methyl-phenol, 2-, 3- and 4-chloro-phenol, 2,3-dimethyl-phenol, 2-methoxy- or ethoxy-phenol, 3- and 4-methoxy-phenol, 2-methyl-3-, -5- or -6-chloro-phenol, 2,6-diethyl-phenol, 2- or 4-cyclohexylphenol, 3-acetylamino-phenol, 4-hydroxy-diphenyl, 4-t-butylphenol, 2-, 3- and 4-hydroxybenzenesulphonic acid, 2-hydroxybenzoic acid, 2-hydroxy-3-methyl-benzoic acid, 2-hydroxy-4-methyl-benzoic acid, 1,3-dihydroxy-benzene, 2-hydroxybenzoic acid methyl ester and ethyl ester, 4-hydroxy-benzoic acid and 2-nitro-phenol.

Aminobenzenes, such as aniline, 2- or 3-amino-toluene, 2,3-, 2,5- or 2,6-dimethyl-aniline, N-methyl- or N,N-dimethylaniline, N-ethyl- or N,N-diethyl-aniline, N,N-dipropyl-aniline, N-(2-chloroethyl)-N-butyl-aniline, N-methyl-N-(2-hydroxyethyl)-aniline, N,N-bis-(2-hydroxy-ethyl)-aniline, N-methyl-N-(2-cyanoethyl)-aniline, N,N-diethyl-2- or -3-methyl-aniline, N,N-bis-(2-hydroxy-ethyl)-3-methyl-aniline, N,N-diethyl-3-acetamino-aniline, N,N-bis-(2-hydroxy-ethyl)-3-acetamino-aniline, N,N-diethyl-3-ethoxy-aniline, N,N-bis-(2-hydroxyethyl)-2-methoxy-5-methyl-aniline, N,N-bis-(2-acetoxy-ethyl)-3-acetamino-aniline, 2- and 3-amino-4-methoxy-toluene, 2-amino-1,4-dimethoxy-toluene, 2,5-dimethoxy-aniline, 3-chloroaniline, 1,3-diamino-benzene, 2,4-diamino-toluene, 1-methoxy-2,4-diaminobenzene, 4-chloro-1,3-diaminobenzene, 4-nitro-1,3-diaminobenzene, 2,4-diaminobenzenesulphonic acid, 4,6-diaminobenzene-1,3-disulphonic acid, 3,5-diamino-4-methylbenzenesulphonic acid, 3,5-diamino-4-chlorobenzenesulphonic acid, N-3-aminophenyl-glycine, N-5-amino-o-tolyl-glycine, 3-amino-acetanilide, 2-amino-4-acetylamino-toluene, 1-acetalamino-3-amino-4-methoxy-benzene, N-(2-hydroxyacetyl)-1,3-diaminobenzene, 3-amino-phenyl-oxamic acid, 3-amino-phenylurea and 3-diethylamino-acetanilide.

Aminophenols, such as 3-amino-phenol, 3-anilino-phenol, 5-amino-2-chloro-phenol, 2-amino-phenol-6-sulphonic acid, 3-amino-phenol-4-sulphonic acid, 3-amino-phenol-4,6-disulphonic acid and 3-acetamino-phenol.

Hydroxynaphthalenes and aminonaphthalenes, such as 1- and 2-amino-naphthalene, 1- and 2-hydroxy-naphthalene, 1,5-, 1,6- and 1,7-dihydroxy-naphthalene, 8-methanesulphonylamino-2-hydroxy-naphthalene, 1-hydroxy-naphthalene-4-sulphonamide, 1-amino-5-hydroxy-naphthalene, 1-amino-7-hydroxy-naphthalene, 2-amino-7-hydroxy-naphthalene, 8-acetamino-2-hydroxynaphthalene, 8-methylsulphonylamino-2-hydroxy-naphthalene and 2-hydroxy-3-naphthoic acid, its amide and anilide, and the anilides substituted by methyl, chlorine, methoxy and sulpho in the aniline nucleus, and 1-hydroxy-2-naphthoic acid, its amide and anilide and the anilides substituted in the aniline nucleus by methyl, chlorine, methoxy and sulpho.

Hydroxy-naphthalene-monosulphonic, -disulphonic and -trisulphonic acids, such as 1-hydroxy-naphthalene-3-, -4- or -5- mono- or -3,6-, -3,7-, -4,8- or -5,7-di- or -3,6,8-trisulphonic acid, 2-hydroxy-naphthalene-4-, -5-, -6- or -7-mono- or -3,6-, -3,7-, -4,8- or -5,7-disulphonic acid, 1-aminonaphthalene-2- to -8-mono- or -5,7-, -4,8-, -3,8-, -4,6-, -3,7- or -3,6-disulphonic acid, 2-amino-naphthalene-1-, -5- to -8-mono- or -5,7-, -4,7-, -3,7- or -3,6-disulphonic acid, 1-amino-8-hydroxy-naphthalene-4- or -5- or -6-mono- or -2,4- or -4,6-disulphonic acid and especially the -3,6-disulphonic acid (H-acid) and its N-acyl derivatives, for example the N-acetyl, N-chloroacetyl, N-propionyl, N-benzoyl, N-m/p-aminobenzoyl, N-m/p-chlorobenzoyl, N-m/p-nitrobenzoyl, N-benzenesulphonyl and toluenesulphonyl derivatives, 2-amino-5-hydroxy-naphthalene-7-sulphonic acid (I-acid) and its N-acyl derivatives, especially also its aminocarbonyl and N-phenylaminocarbonyl derivatives, such as ureido- or phenylureido-J-acids, 2-amino-5-hydroxy-naphthalene-1,7-disulphonic acid and its N-acetyl and N-benzoyl derivatives, 2-amino-5-hydroxy-naphthalene-4,8-disulphonic acid and its N-acetyl and N-benzoyl derivatives, 2-amino-6-hydroxynaphthalene-8-sulphonic acid and its N-acetyl and N-benzoyl derivatives, 2-amino-8-hydroxy-naphthalene-6-sulphonic acid (gamma-acid) and its N-acyl derivatives as listed above, as well as its N,N-dimethyl and N-phenyl derivatives, such as, for example, N-(2,6-dimethylphenyl)-gamma-acid, 2-amino- or 2-acetylamino-8-hydroxy-naphthalene-3,6-disulphonic acid, 1,7-dihydroxy-naphthalene-2,4- or 3,6-disulphonic acid, 1-hydroxy-8-methoxy- or -ethoxy- or -hydroxyethoxy-naphthalene-3,6-disulphonic acid, 1-hydroxy-8-chloro-naphthalene-3,6-disulphonic acid, also 2-phenylazo-1-amino-8-hydroxy-naphthalene-3,6- or -4,6-disulphonic acid, 2-(2-, 3- or 4-chloro, carboxy, sulpho, acetylamino or nitrophenylazo)- or (2,5- or 3,4-dichloro-phenylazo)-1-amino-8-hydroxy-naphthalene-3,6- or -4,6-disulphonic acid, 6- or 7-(2,4-diamino- or -dihydroxyphenylazo)-1-hydroxy-naphthalene-3-sulphonic acid, 6- or 7-N-aryl-1-hydroxy-naphthalene-3-sulphonic acid (aryl = phenyl, 4-methyl- or 4-methoxy-phenyl, 3-carboxy- or 3-sulpho-phenyl) and 2-sulpho- or 2,8-disulpho-4-hydroxy-α,β-naphthophenazine.

Acetoacetic acid arylides, such as acetoacetic acid anilide, -o-, -m- and -p-ansidide and -O-, -m- and -p-toluidide, acetoacetic acid 2- and 4-chloro-anilide, acetoacetic acid 4-chloro-2-methyl-anilide, acetoacetic acid 2,4- or 2,5- or 2,6-dimethyl-anilide, acetoacetic acid 4-sulpho-anilide, acetoacetic acid 2-methoxy-4-sulpho-5-methyl-anilide, acetoacetic acid 2,4- or 2,5- or 3,5-disulpho-anilide, acetoacetic acid 2,5-disulpho-4-acetylamino-anilide, acetoacetic acid 2- or 3-sulpho-4-ethoxy-anilide, acetoacetic acid 3-sulpho-4-methyl-anilide, acetoacetic acid 3,5-disulpho-4-amino-anilide, acetoacetic acid 2,5-dimethoxy-anilide and acetoacetic acid 4-chloro-2,5-dimethoxy-anilide.

Pyrazolones and iminopyrazolones, such as 3-methyl-5-pyrazolone, 1-phenyl-3-methyl-5-pyrazolone, 1-(2-chloro-phenyl)-3-methyl-5-pyrazolone, 1-(2,5-dichloro-phenyl)-3-methyl-5-pyrazolone, 1-phenyl-3-methyl-5-pyrazolone-3-carboxylic acid and its ethyl ester, 1-phenyl-3-methyl-5-pyrazolonimide, 1-(2-chloro-phenyl)-3-methyl-5-pyrazolonimide, 1,o-tolyl-3-methyl-5-pyrazolonimide, 1(2-, 3- or 4-sulpho-phenyl)-3-methyl-5-pyrazolone, 1-(6-chloro-3-sulpho-phenyl)-3-methyl-5-pyrazolone, 1-(2,5-dichloro-4-sulpho-phenyl)-3-methyl-5-pyrazolone, 1-(4-sulpho-2-methyl-phenyl)-3-methyl-5-pyrazolone, 1-(6-chloro-4-sulpho-2-methyl-phenyl)-3-methyl-5-pyrazolone, 1-(4-sulpho-phenyl)-3-methyl-5-pyrazolonimide, 1-[8-sulphonaphthyl-(2)]-3-methyl-5-pyrazolonimide, 1-(6- sulpho-naphthyl-2)-3-methyl-5-pyrazolone, 1-(4-sulpho-phenyl)-5-pyrazolone-3-carboxylic acid, 1-(6-chloro-4-sulpho-2-methyl-phenyl)-5-pyrazolone-3-carboxylic acid ethyl ester, 1-(4-amino-phenyl)-3-methyl-5-pyrazolone, 1-(3-amino-phenyl)-3-methyl-5-pyrazolone, 1-(3-amino-5-sulpho-2-methyl-phenyl)-3-methyl-5-pyrazolone, 1-(3- or 4-amino-phenyl)-5-pyrazolone-3-carboxylic acid, 1-[3-(3-nitro-benzoyl-amino)-phenyl]-5-pyrazolone-3-carboxylic acid, 1-carboxymethyl-3-methyl-5-pyrazolone, 1-(2-cyanoethyl)-3-methyl-5-pyrazolone, 1-(2-chloroethyl)-3-methyl-5-pyrazolone and 1-methyl-, -ethyl-, -propyl-3-methyl-5-pyrazolone.

Pyridones and quinolones, such as 2-hydroxy-6-pyridone, 2-hydroxy-4-methyl-5-cyano-6-pyridone, 1-methyl-2-hydroxy-4-methyl-5-cyano-6-pyridone, 1-phenyl-2-hydroxy-4-methyl-5-cyano-6-pyridone, 1-ethyl-2-hydroxy-4-methyl-5-cyano-6-pyridone, 1-p-tolyl-2-hydroxy-4-methyl-5-cyano-6-pyridone, 1-benzyl-2-hydroxy-4-methyl-5-cyano-6-pyridone, 2-hydroxy-4-methyl-5-carbethoxy-6-pyridone or -5-carbonamido-6-pyridone, 2,4-dihydroxy-quinoline, 8-hydroxy-quinoline and 2-hydroxy-4-carboxy-6-pyridone.

Pyrimidines, such as 2,4,6-trihydroxy-pyrimidine, 2-methyl-4,6-dihydroxy-pyrimidine, 2-phenyl-4-amino-6-hydroxy-pyrimidine and 2-phenyl-4,6-dihydroxy-pyrimidine.

Indoles, such as 2-methyl-indole, 2-phenyl-indole, 1-methyl-2-phenyl-indole, 1,2-dimethyl-indole, 2-β-naphthyl-indole, 2-p-biphenyl-indole, 2,5-dimethyl-indole, 1-ethyl-2-phenyl-indole, 2-methyl-5-indole-sulphonic acid, 2-ethyl-5-indole-sulphonic acid, 2-phenyl-5-indole-sulphonic acid, 1-methyl-2-phenyl-5-indole-sulphonic acid, 1,2-dimethyl-5-indole-sulphonic acid, 1-ethyl-2-methyl-5-indole-sulphonic acid, 1,2,5-trimethyl-5-indole-sulphonic acid, 2,5-dimethyl-5-indole-sulphonic acid and 2-methyl-5-nitro-indole.

Preferred dyestuffs of the formula (I) are those of the formula

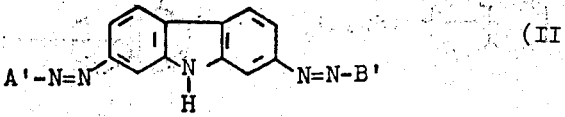
(II)

wherein
A' and B' represent radicals which are different from one another, and are optionally O-acylated, of a coupling component of the hydroxybenzene, aminobenzene, hydroxynaphthalene, aminonaphthalene or aminohydroxynaphthalene series with a hydroxyl or amino group in the o- or p-position relative to the azo group,
preferably those with at least one sulphonic acid group.
Further preferred dyestuffs are those of the formula:

A-N=N-[carbazole]-N=N-B''  (III)

wherein
A has the abovementioned meaning and
B'' represents a radical different from A, of the formulae:

(III a)  (III b)

(III c)  (III d)

(III e)  (III f)

(IIIg) 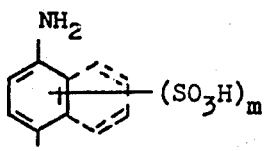

(IIIh) 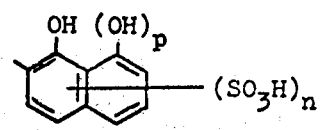

wherein
$R_3$ = hydrogen, sulpho, $C_1$-$C_4$-alkyl, especially methyl, nitro, acylamino, chlorine, $C_1$-$C_4$-alkoxy or hydroxyl,
$R_4$ = hydrogen, $C_1$-$C_4$-alkyl or halogen,
$R_5$ = hydrogen, carboxyl, $C_1$-$C_4$-alkyl, especially methyl, or sulpho,
$n$ = 1 or 2,
$m$ = 0, 1 or 2 and
$p$ = 0 or 1.

Further preferred dyestuffs are trisazo dyestuffs of the formula

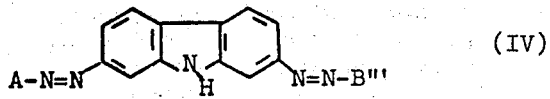
(IV)

wherein
A has the abovementioned meaning and
B''' represents a radical different from A, of the formulae

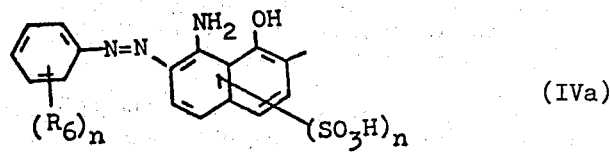
(IVa)

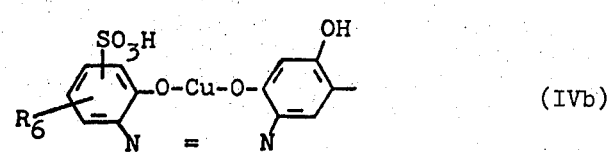
(IVb)

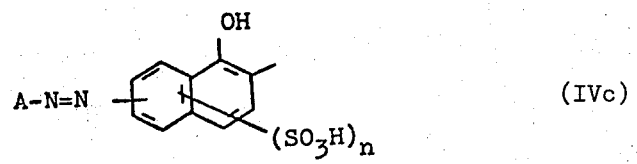
(IVc)

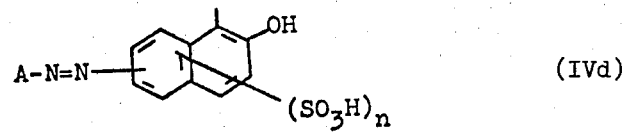
(IVd)

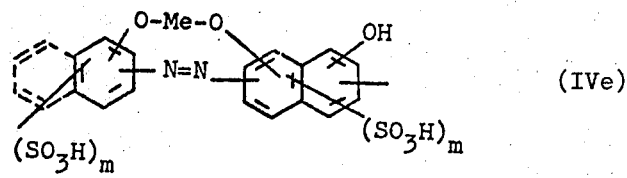
(IVe)

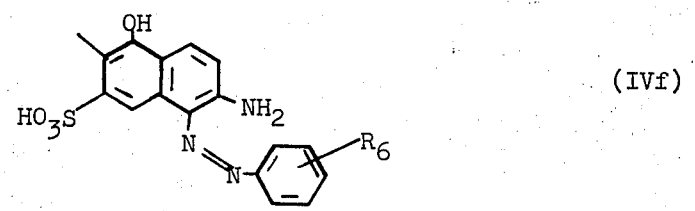
(IVf)

wherein
n and m have the abovementioned meaning and
$R_6$ denotes hydrogen, $C_1$-$C_4$-alkyl, especially methyl, nitro, sulpho, halogen, especially chlorine, amino and acylamino and
Me represents a heavy metal such as copper, iron, nickel, cobalt or chromium.

Further preferred dyestuffs are trisazo dyestuffs of the formula

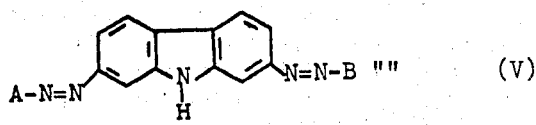

$$A-N=N\phantom{xxxxxxxxxxxxxxx}N=N-B'''' \qquad (V)$$

wherein
A has the abovementioned meaning and
B'''' represents a radical different from A, of the formulae:

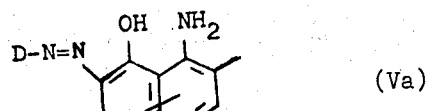

$$(Va)$$

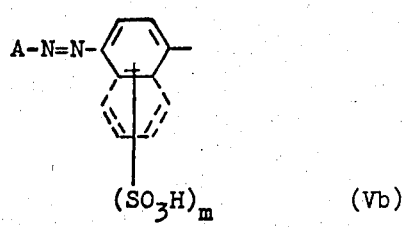

$$(Vb)$$

wherein
A, n and m have the abovementioned meaning and
D denotes the radical of a diazo component, preferably of an aromatic-carbocyclic diazo component.

The application further relates to processes for the manufacture of the new polyazo dyestuffs of the formulae I – V and their use for dyeing and printing natural and synthetic fibre materials containing hydroxyl groups or amide groups, such as cellulose, wool, high molecular polyamide and paper and leather.

The new asymmetrical dyestuffs are obtained in a manner which is in itself known by coupling 1 mol of tetraazotised 2,7-diamino-carbazole with about 1 mol of a coupling component A-H and about 1 mol of a coupling component B-H which can be identical with A-H only if the coupling is carried out in such a way that an asymmetrical reaction product results, in an organic, aqueous-organic and preferable aqueous medium, in the acid, neutral or alkaline pH range, at temperatures of 0° to 50°C, it being possible to facilitate the coupling reaction, under certain circumstances, by means of known coupling accelerators, and optionally subsequent alkylation or acylation of the nuclear hydroxyl group. As coupling accelerators it is possible to use, for example: amides of carboxylic acids, especially urea, formamide and dimethylformamide, also pyridine, pyrrolidone, quinoline or pyridine bases or (poly)-glycol ethers or alkyl ethers. The coupling components A-H and B-H must be different. Identical coupling components can only be used if the coupling in the two stages is carried out in such a way that, for example, in the case of compounds which couple twice, the coupling takes place in different positions in the two stages.

The new asymmetrical dyestuffs of the formula (I) to (IV) are obtained in the usual manner by one-sided coupling of the tetrazotised 2,7-diamino-carbazole with the coupling component A-H, the coupling optionally being carried out in the presence of coupling accelerators such as urea or dimethylformamide. The second coupling with the coupling components of the formula B-H, B'-H, B''-H and B'''-H is generally carried out without intermediate isolation, optionally in the presence of coupling accelerators such as urea, dimethylformamide or pyridine bases. In some cases it is also necessary to reverse the coupling sequence in order to manufacture the dyestuffs. The alkylated or acylated dyestuffs of the formula (I) are obtained, in a manner which is in itself known, when dyestuffs of the formula (III), in which B' corresponds to the formula (III b), are esterified with acylating agents at the OH group, or etherified with alkylating agents. Possible acylating agents are preferably acyl halides such as benzoyl chloride, acetyl chloride, chloroacetyl chloride, propionyl chloride, benzene sulphochloride, toluene sulphochloride, chlorobenzene sulphochloride, α- and β-naphthyl sulphochloride, diphenylsulphonyl chloride and methane sulphochloride. As alkylating agents there may be mentioned: alkyl halides such as methyl chloride, bromide or iodide, ethyl chloride, bromide or iodide, chloroacetic acid or bromoacetic acid or chloropropionic acid or bromopropionic acid, dialkyl sulphates such as dimethyl sulphate or diethyl sulphate, benzenesulphonic acid methyl ester or ethyl ester or toluenesulphonic acid methyl ester or ethyl ester.

Dyestuffs of the formula (I) containing amino groups can optionally be converted into the N-acyl compound by means of acylating agents, as indicated above, or be alkylated partially or completely with alkylating agents, as mentioned above.

Dyestuffs of the formula (V) in which radical B'''' corresponds to the formula (V a) are obtained by coupling dyestuffs of the formula (III), in which B'' corresponds to the formula (III f), with diazotised amines D-NH₂ and subsequently combining the product with a coupling component A-H, preferably (III a). The same dyestuffs are obtained by coupling tetrazotised 2,7-diamino-carbazole with coupling components of the formula (III f) on one side, subsequently coupling the product with AH or (III a) and combining the second free coupling position in (III f) with a diazotised amine D-NH₂. Dyestuffs of the formula (V) in which radical B'''' corresponds to the formula (V b) are obtained by coupling tetrazotised 2,7-diamino-carbazole with amino coupling components of the formula (III g) in the para-position, again diazotising the amino group and combining the tetrazo compound with coupling compounds A-H.

The new disazo or polyazo dyestuffs are outstandingly suitable for dyeing and printing natural or synthetic fibre materials containing hydroxyl groups and containing nitrogen, for example cellulose fibres in all states of processing, especially cotton and regenerated cellulose. The dyestuffs are also very suitable for paper pulp and paper materials as well as for wool, wool-cotton union, silk, high molecular polyamide and leather. The dyeings show good fastness properties (wet fastness and light fastness properties). The wet fastness properties of the dyeings are advantageously improved by after-treatment agents for cotton dyeings such as, for example, cationic auxiliaries. In high quality finishing (crease-resistant finishing) the dyeings obtained with the new disazo or polyazo dyestuffs show a favourable behaviour especially with regard to constancy of colour shade and fastness to light.

In the manufacture of the new dyestuffs it can be of advantage, for example in order to improve the solubility, to use mixtures of coupling components. A further subject of the invention are mixtures of the dyestuffs which can be manufactured according to the process.

The formulae indicated relate to the free acids. However, the dyestuffs are preferably employed in the form of their salts, preferentially the alkali metal salts, especially the sodium, potassium or ammonium salts, which also form a subject of the invention.

EXAMPLE 1

19.7 parts (0.1 mol) of 2,7-diamino-carbazole are dissolved in 375 parts of water and 110 parts by volume of hydrochloric acid (D 1.14) at 60°C and thereafter tetraazotised in the usual manner, at 0° – 5°C, with 46 parts of 30% strength aqueous sodium nitrite solution. The mixture is stirred for approx. 15 minutes longer and is clarified, if necessary, by removing slight impurities, and any excess nitrous acid is removed with amidosulphonic acid. The tetrazonium salt solution is buffered to pH 40at 0°–5°C and combined with a solution of 31.9 parts (0.1 mol) of 1-amino-8-hydroxy-naphthalene-3,6-disulphonic acid (H-acid) in 1,240 parts of water and 22 parts of sodium hydroxide. After completion of the one-sided coupling, a solution of 22.4 parts (0.1 mol) of 1-hydroxy-naphthalene-4-sulphonic acid in 165 parts of water and 11 parts of sodium hydroxide is added and coupling is carried out, using sodium carbonate solution to bring the pH to 8 – 8.5. After completion of coupling, the dyestuff is separated out in the usual manner by means of sodium chloride, isolated and dried. The dyestuff dyes cotton in a blue colour.

If instead of 1-hydroxy-naphthalene-4-sulphonic acid the following compounds are used as the alkaline second coupling component, pyridine optionally being added to accelerate the coupling, reddish-tinged to greenish-tinged blue dyestuffs are obtained: N-acetyl-H-acid, N-benzoyl-H-acid, N-4-nitro-benzoyl-H-acid, N-3- or -4-aminobenzoyl-H-acid, K-acid, N-acetyl-K-acid, N-benzenesulphonyl-K-acid, N-acetyl-gamma-acid, N-benzoyl-gamma-acid, N-chloroacetylgamma-acid, N-4-nitro-benzoyl-gamma-acid, N-benzene- or toluenesulphonyl-gamma-acid, 1-naphthol-5-sulphonic acid, 1-naphthol-5,7-disulphonic acid, 2-naphthol-4-, -5- or -6-sulphonic acid, 2-naphthol-3,6-disulphonic acid, 2-amino-5-hydroxy-naphthalene-7-sulphonic acid (I-acid), N-acetyl-I-acid, N-benzoyl-I-acid, N-carbonylamino-I-acid, N-carbonylphenylamino-I-acid 2-hydroxy-3-naphthoic acid, 2-hydroxynaphthoic acid anilide, 2-hydroxy-naphthoic acid 4-sulphanilide, 2-(2,4-diaminophenylazo)-8-hydroxy-naphthalene-6-sulphonic acid, 2-(phenylazo)-1-amino-8-hydroxy-naphthalene-3,6-disulphonic acid, 2-(4-chloro- or -nitro- or -sulphophenylazo)-1-amino-8-hydroxy-naphthalene-3,6- or -4,6-di-sulphonic acid, 2-(2,5-dichloro-phenylazo)-1-amino-8 hydroxynaphthalene-3,6- or -4,6-disulphonic acid, 2-amino-5-hydroxynaphthalene-1,7-disulphonic acid, N-phenyl-I- or -gamma-acid, N-3-carbophenyl-I- or -gamma-acid, N-3-sulphophenyl-gamma-acid, 2-hydroxy-8-amino-naphthalene-5- or -6-sulphonic acid, 2-hydroxy-6-amino-naphthalene-4-sulphonic acid and 2,8-disulpho-4-hydroxy-naphthophenazine.

EXAMPLE 2

If, instead of 1-hydroxy-naphthalene-4-sulphonic acid, 2-amino-8-hydroxy-naphthalene-6-sulphonic acid (gamma-acid) is used as the second coupling component, a dyestuff which dyes cotton in blue shades is obtained.

EXAMPLE 3

In in Example 1, instead of 1-hydroxy-naphthalene-4-sulphonic acid, ortho- or para-cresol, phenol, 2- or 4-phenol-sulphonic acid or salicylic acid is used as the second coupling component, blue-black to grey-black dyestuffs are obtained.

If, instead of 1-hydroxy-naphthalene-4-sulphonic acid, 1,3-diamino-benzene, 1-amino-3-hydroxy-benzene, 3-acetylaminodiethyl-aniline, 1,3-diamino-benzene-4-sulphonic acid, 1,3-diamino-4-nitro- or -chloro-benzene, 3-methyl-aniline, 2,4-diamino-toluene, 3-$\beta$-hydroxy-ethyl-amino-aniline or 3-amino-phenyl-urea are used, dyestuffs of a red-violet to blue-violet shade are obtained.

EXAMPLE 4

If instead of 1-amino-8-hydroxy-naphthalene-3,6-disulphonic acid of Example 1 the equivalent amount of gamma-acid is used as the first coupling component, the naphthol coupling component of Example 1 yields dyestuffs of a blue shade.

With the benzene coupling components of Example 3 as the second coupling component, blue-black to violet dyestuffs are obtained.

EXAMPLE 5

19.7 parts (0.1 mol) of 2,7-diamino-carbazole are tetrazotised as described and combined with an acid solution of 23.9 parts (0.1 mol) of 2-amino-8-hydroxy-naphthalene-6-sulphonic acid (gamma-acid) in 250 parts of water and 280 parts of urea. The mixture is stirred until the one-sided acid coupling is complete, and then a solution of 23.9 parts (0.1 mol) of gamma-acid in 300 parts of water and 140 parts of 20% strength sodium carbonate solution, and 150 parts of pyridine, are added. The mixture is stirred until the alkaline coupling is complete and the dyestuff is isolated in the usual manner and dried. The dyestuff dyes cotton in blue shades.

If the coupling components indicated in Example 1 are used as alkaline second coupling components, blue dyestuffs are obtained.

If the phenolic coupling components indicated in Example 3 are used as alkaline second coupling components, bluish-tinged red to brown dyestuffs are obtained.

EXAMPLE 6

19.7 parts (0.1 mol) of 2,7-diamino-carbazole are tetrazotised as described and combined, at room temperature, with an acid solution of 31.9 parts (0.1 mol) of 1-amino-8hydroxy-naphthalene-3,6-disulphonic acid (H-acid) in 250 parts of water and 320 parts of urea. The mixture is first stirred at pH 1 – 2 until the one-sided acid coupling is complete and is then neutralised with sodium carbonate solution at 0° – 5°C, the diazonium salt solution of 9.3 parts (0.1 mol) of aniline is added, and coupling is completed at pH 9. Thereafter, a solution of 10.8 parts (0.1 mol) of 1,3-diamino-benzene in 13 parts of water is added and coupling is completed under alkaline conditions. After completion of coupling, the dyestuff is salted out with sodium chloride in the usual manner, isolated and dried. The dyestuff dyes cotton, polyamide, paper and leather in greenish-tinged black shades.

If, instead of aniline, the diazo component D-NH$_2$ which is used is the equivalent amount of 2-, 3- or 4-nitroaniline, 2-, 3- or 4-chloro- or 2,4-, 2,5- or 3,4-dichloroaniline, 4-methylaniline, 2- or 4-amino-benzoic acid, 4-amino-anisole, benzoyl- or acetyl-p-phenylenediamine, aniline-2,4- or -2,5- or 3,5-disulphonic acid, aniline-2-, -3- or -4-sulphonic acid, 4-chloro- or methyl-2- or -3-sulphoaniline, 4-nitroaniline-2-sulphonic acid, 2- or 3-methoxyaniline-sulphonic acid, 1-amino-naphthalene-4-sulphonic acid, 2-amino-naphthalene-5- or -6-sulphonic acid, 1-aminonaphthalene-4,6- or -4,7-disulphonic acid, 2-amino-naphthalene-4,8- or -6,8-disulphonic acid, 2-amino-naphthalene-3,6,8- or 4,6,8-trisulphonic acid, 4-amino-azobenzene- 4'-sulphonic acid or -3,4'-disulphonic acid or 4-amino-ethoxybenzene, dyestuffs of a black-green to black shade are obtained.

If instead of 1,3-diamino-benzene the coupling component A-H which is used is the equivalent amount of 1-amino-3-hydroxy-benzene, diethylaniline, 3-aminodiethylaniline, 3-acetylaminodiethylaniline, 1,3-diamino-benzene-4-sulphonic acid, 1,3-diamino-4-nitro- or -chloro-benzene, 2,4-diaminotoluene, 3-amino-phenylglycine, 3-hydroxy-2'- or -4'-methyldiphenylamine, 5-amino-2-toluyleneglycine, 3-aminophenylurea, 3-$\beta$-hydroxyethyl-amino-aniline, 1,8-diamino-naphthalene, 1-amino-naphthalene, acetonyl-1,8-diamino-naphthalene, 1-amino-8-hydroxy-naphthalene-3,6-disulphonic acid, N-acetyl-H-acid, gamma-acid, N-acetyl-gamma-acid, and N-benzoyl-H-acid, and the abovementioned diazo components D-NH$_2$ are employed, reddish-tinged, bluish-tinged or greenish-tinged black dyestuffs are obtained.

If, on the other hand, instead of 1,3-diaminobenzene the equivalent amount of phenol, ortho- or meta-cresol, 2-chlorophenol, resorcinol, salicylic acid, methylsalicylic acid or sulpho-salicylic acid is used, dyestuffs which dye cotton in green shades are obtained.

Instructions for dyeing cotton 260 parts of water at 50° – 60°C are initially introduced into a dyeing beaker located in a heated water bath, and 10 parts of 10% strength sodium sulphate solution and 1 part of 10% strength sodium carbonate solution are added. 0.25 parts of the dyestuff obtained in Example 6, section 1, are thoroughly worked into a paste with 2 parts of cold water and 30 parts of warm water (50° – 60°C) are added; hereupon, the dyestuff dissolves. The dyestuff solution is added to the liquor first introduced, and 10 parts of cotton fabric are constantly agitated in this dyeing liquor. The temperature of the dyeing liquor is raised to 85° – 90°C over the course of 30 minutes and dyeing is continued for 60 minutes at this temperature. The dyed material is withdrawn from the dyeing liquor, the adhering liquor is removed by wringing out and the material is rinsed with cold water for 5–10 minutes and dried at 60° – 70°C. A black-green dyeing is obtained.

Instructions for dyeing paper 200 parts of paper pulp - containing sulphite cellulose and water (corresponding to approx. 5 parts of dry pulp) - are mixed with 500 parts of water, combined with the dyestuff solution prepared from 1 part of the dyestuff according to the above example and 100 parts of water, and stirred. After about 10 minutes, sizing and fixing are carried out in the usual manner. Thereafter, the pulp is suction-drained on the sheet-former; the product is then pressed and dried, and a sheet of paper dyed black-green is obtained.

EXAMPLE 7

19.7 parts (0.1 mol) of 2,7-diamino-carbazole are tetrazotised as described and combined, and coupled, at room temperature with an acid solution of 31.9 parts (0.1 mol) of 1-amino-8-hydroxy-napthalene-3,6-disulphonic acid (H-acid) in 250 parts of water and 320 parts of urea, as in Example 6. After completion of the acid one-sided coupling, a solution of 22.4 parts (0.1 mol) of 1-hydroxy-naphthalene-4-sulphonic acid in 200 parts of water is added and coupling is completed in a medium rendered alkaline with sodium carbonate, at pH 9.5 – 10. The dyestuff, isolated in the usual manner, dyes cotton in a blue shade.

If, instead of 1 -hydroxy-naphthalene-4-sulphonic acid, the alkaline second coupling component used is 2-amino-5-hydroxy-naphthalene-7-sulphonic acid (I-acid), N-acetyl-I-acid, gamma-acid, N-acetyl- or N-benzoyl-H-acid, N-3- or -4-aminobenzoyl-H-acid, N-phenyl-gamma- or -I-acid, or 2-sulpho-4-hydroxy-$\alpha,\beta$-naphthophenazine, blue dyestuffs are obtained.

EXAMPLE 8

19.7 parts (0.1 mol) of 2,7-diamino-carbazole are tetrazotised as described, combined with a neutral solution of 30.4 parts (0.1 mol) of 2-hydroxy-naphthalene-6,8-disulphonic acid in 300 parts of water, and coupled at pH 7–8. After completion of the one-sided coupling, a solution of 9.4 parts (0.1 mol) of phenol in 100 parts of water and 17 parts of sodium carbonate is added and coupling is completed overnight. Thereafter, 21.9 parts (0.12 mol) of p-toluenesulphonyl chloride are added to the dyestuff solution at 40°C and the pH value is kept at 10 with sodium hydroxide solution. After completion of the esterification, the dyestuff is isolated in the usual manner and dried. The dyestuff dyes cotton, polyamide and wool in red shades.

If, instead of p-toluenesulphonyl chloride, benzenesulphonyl chloride or a mixture of both compounds is used for the esterification, red dyestuffs are again obtained.

If, instead of phenol, o- or m-cresol are used as the coupling component and estrification is carried out as described above, red dyestuffs are again obtained.

EXAMPLE 9

19.7 parts (0.1 mol) of 2,7-diamino-carbazole are tetrazotised as described and combined, at 0° – 5°C, with a solution of 13.8 parts (0.1 mol) of salicylic acid, 150 parts of water and 16 parts of sodium carbonate. 50 parts of urea are optionally added to accelerate the coupling. The pH value is adjusted to 9.5 with sodium carbonate solution and after completion of the one-sided coupling a solution of 42.9 parts (0.1 mol) of 2-(phenylazo)-1-amino-8-hydroxynaphthalene-3,6-disulphonic acid, 150 parts of water and 20 parts of sodium carbonate is added. 100 parts of pyridine are optionally added to accelerate the coupling. The dyestuff isolated in the usual manner after completion of coupling dyes cotton in green shades.

If instead of 2-(phenylazo)-1-amino-8-hydroxynaphthalene-3,6-disulphonic acid the second coupling component used is the equivalent amount of 2-(2'-chloro- or -4'-nitro- or -2',5'-dichloro- or -4'-sulpho- or 4'-nitro-2'-sulphophenylazo)-1-amino-8-hydroxy-naphthalene-3,6-disulphonic acid or 2-(2',5'-dichloro-4'-sulpho- or 2',4'-disulpho-phenylazo)-1-amino-8-hydroxy-naphthalene-3-sulphonic acid, dyestuffs are obtained which dye cotton is green shades. If, instead of salicylic acid as the first coupling component, the equivalent amount of phenol or ortho- or meta-cresol is used as the coupling component, dyestuffs which dye cotton in green shades are again obtained.

If on the other hand, instead of 2-(phenylazo)-1-amino-8-hydroxy-naphthalene-3,6-disulphonic acid, the second coupling component used in the above example is gamma-acid, 2-amino-8-hydroxy-3,6-disulphonic acid, N-phenyl- or N-4-sulphophenol- or N-4-carboxyphenol-gamma-acid, 2-amino-8-hydroxy-naphthalene-5-sulphonic acid or -5,7-disulphonic acid or the copper complex of 2,2',4-trihydroxy-azobenzene-5'-sulphonic acid, red-brown to brown dyestuffs are obtained.

EXAMPLE 10

19.7 parts (0.1 mol) of 2,7-diamino-carbazole are tetrazotised as described and coupled with 13.8 parts (0.1 mol) of salicylic acid as in Example 9. After completion of the one-sided coupling, the pH value of the solution is adjusted to 1 – 2 and the solution is subsequently combined with an acid solution of 23.9 parts (0.1 mol) of gamma-acid, 300 parts of water and 320 parts of urea. After completion of the coupling, the dyestuff is isolated in the usual manner and dried. The dyestuff dyes cotton, wool and polyamide in bluish-tinged red shades.

EXAMPLE 11

If the tetrazonium salt solution of 2,7diaminocarbazole, which has been described, is coupled one-sided with 1-(3-sulpho-phenyl-3-methyl-5-pyrazolone and subsequently with 1-(3-sulpho-phenyl)-3-methyl-5-pyrazolonimide, a dyestuff which dyes cotton, wool and polyamide in orange-coloured shades is obtained.

If, instead of 1-(3-sulpho-phenyl)-3-methyl-5-pyrazolonimide, the second coupling component used is 1-hydroxy-naphthalene-4-sulphonic acid, gamma-acid or H-acid (coupled under acid or alkaline conditions), N-acetyl-gamma-acid or the copper complex of 2,2',4-trihydroxy-azobenzene-5'-sulphonic acid, red-brown to brown dyestuffs are obtained.

EXAMPLE 12

If the tetrazonium salt solution of 2,7-diaminocarbazole which has been described is coupled one-sided to 7-(2,4-diamino-5-sulphophenylazo)-1-hydroxy-naphthalene-3-sulphonic acid and subsequently to phenol, ortho- or meta-cresol, resorcinol, 1,3-diaminobenzene or 1,3-diaminobenzene-4-sulphonic acid, dyestuffs of black shades are obtained.

We claim:
1. Azo dyestuff of the formula

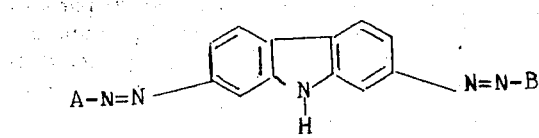

wherein B represents a radical of the formula

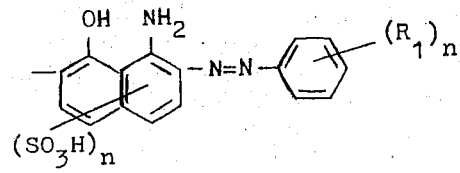

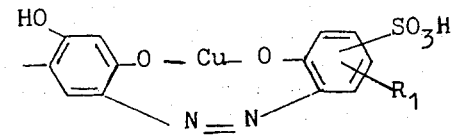

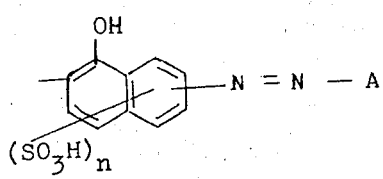

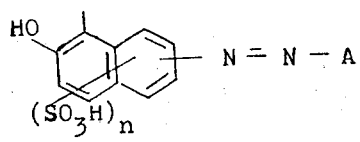

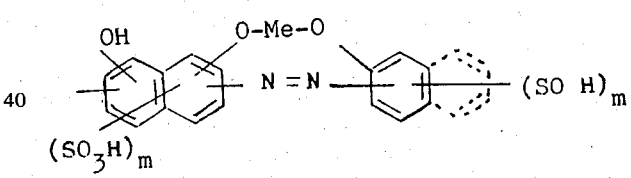

or

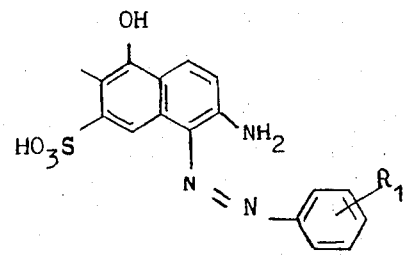

A is hydroxyphenyl; hydroxyphenyl substituted by methyl, ethyl, tert.-butyl, cyclohexyl, methoxy, ethoxy, phenyl, chloro, acetylamino, carboxy, methoxycarbonyl, ethoxycarbonyl, hydroxy, sulfo or nitro; anilino; anilino substituted by methyl, ethyl, propyl, butyl, chloroethyl, acetoxyethyl, hydroxyethyl, cyanoethyl, acetylamino, methoxy, ethoxy, chloro, $-NH_2$, nitro, hydroxy, sulfo, carboxymethylamino, hydroxyacetylamino, carboxycarbonylamino or aminocarbonylamino; hydroxynaphthalene; aminonaphthalene;

hydroxynaphthalene or aminonaphthalene substituted by hydroxy, methoxy, ethoxy, hydroxyethoxy, methylsulfonylamino, amidosulfonyl, acetylamino, carboxy, amidocarbonyl, anilidocarbonyl, anilidocarbonyl substituted in the aniline nucleus by methyl, chlorine, methoxy or sulfo, sulfo, chloroacetylamino, propionylamino, benzoylamino, animobenzoylamino, chlorobenzoylamino, nitrobenzoylamino, benzenesulfonylamino, toluenesulfonylamino, aminocarbonylamino, phenylaminocarbonylamino, dimethylamino, phenylamino or chloro;

n is 1 or 2;

m is 0, 1 or 2;

$R_1$ is hydrogen, $C_1$-$C_4$-alkyl, nitro, sulfo, chloro, —$NH_2$ or acetylamino;

Me is copper, iron, nickel, cobalt or chromium.

2. Azo dyestuff of claim 1 of the formula

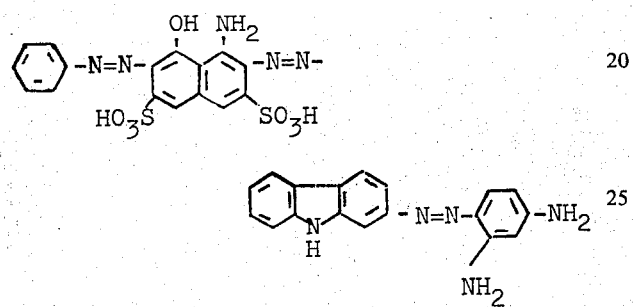

3. Azo dyestuff of claim 1 of the formula

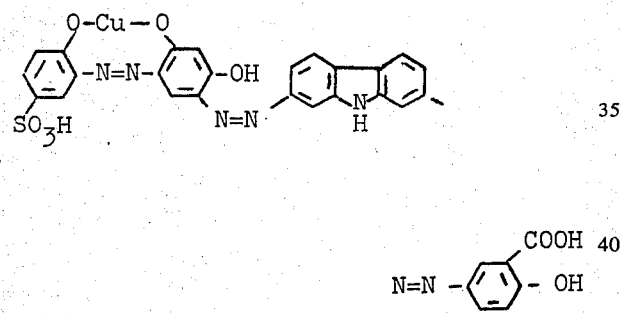

4. Azo dyestuff of claim 1 of the formula

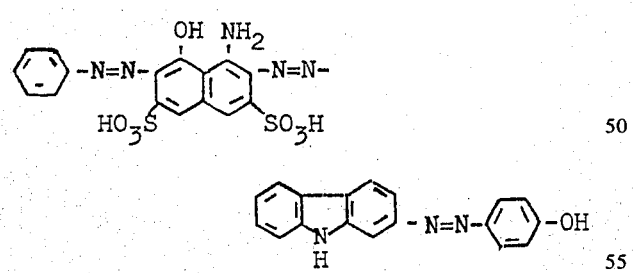

5. Azo dyestuff of claim 1 of the formula

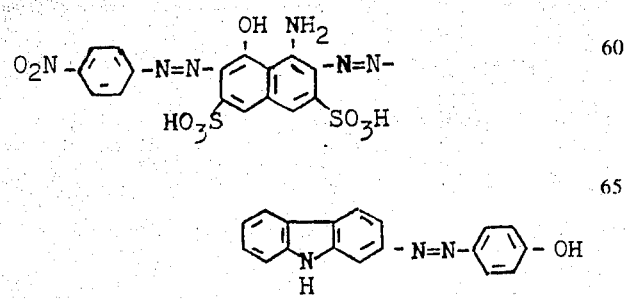

6. Azo dyestuff of claim 1 of the formula

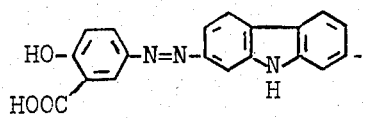

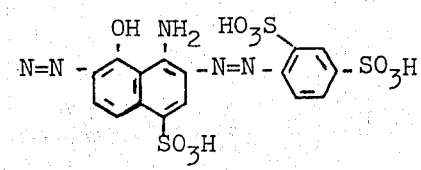

7. Azo dyestuff of the formula

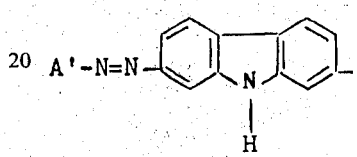

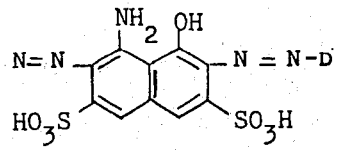

in which

A' is the radical of a coupling component coupled under alkaline conditions selected from the group consisting of m-diaminophenyl, 1-hydroxy-3-aminophenyl, diethylaminophenyl, 1-diethylamino-3-aminophenyl, 1-diethylamino-3-acetylaminophenyl, 1,3-diamino-4-sulphophenyl, 1,3-diamino-4-nitrophenol, 1,3-diamino-4-chlorophenyl, 1,3-diamino-4-methylphenyl, 1-amino-3-(carboxy-aminomethyl)-phenyl, 1-(2-methylphenylamino)-3-hydroxyphenyl, 1-(4-methylphenyl-amino)-3-hydroxyphenyl, 1-amino-3-(carboxy-amino-methyl)-4-methyl-phenyl, 1-amino-3-aminocarbonyl-aminophenyl, 1-amino-3-(2-hydroxyethylamino)-phenyl, 1,8-diaminonaphthyl, 1-aminonaphthyl, 1-amino-8-acetonylamino-naphthyl, 1-amino-8-hydroxy-3,6-disulphonaphthyl, 1-acetylamino-8-hydroxy-3,6-disulphonaphthyl, 2-amino-8-hydroxy-6-sulphonaphthyl, 2-acetylamino-8-hydroxy-6-sulphonaphthyl, 1-benzoylamino-8-hydroxy-3,6-disulphonanphthyl, hydroxyphenyl, 1-hydroxy-2-methylphenyl, 1-hydroxy-3-methylphenyl, 1-hydroxy-2-chloro-phenyl, 1,3-dihydroxyphenyl, 1-hydroxy-2-carboxyphenyl, 1-hydroxy-2-carboxy-methylphenyl, and 1-hydroxy-2-carboxy-sulphophenyl; and D is phenyl; nitrophenyl; chlorophenyl; 2,4-, 2,5- or 3,4-dichlorophenyl; 4-methyl-phenyl, 2- or 4-carboxyphenyl; 4-methoxyphenyl; 4-benzoylaminophenyl; 4-acetylaminophenyl; 2,4-, 2,5 or 3,5-disulphophenyl; sulphophenyl; 4-chloro 2- or 3-sulphophenyl; 4-methyl 2- or 3-sulfophenyl; 4-nitro 2-sulphophenyl; 2 or 3-methoxysulphophenyl; 4-sulphonaphthyl-1; 5- or 6-sulphonaphthyl-2; 4,6- or 4,7-disulpho-naphthyl-1; 4,7- or 6,8-disulpho-naphthyl-2; 3,6,8- or 4,6,8-trisulphonaphthyl-2; 4-(4'-sulpho-phenyl)-azo-phenyl; 3-sulpho4-(4'-sulpho-phenyl)-azo-phenyl or 4-ethoxy-phenyl.

* * * * *